(12) United States Patent
Li et al.

(10) Patent No.: US 9,652,673 B2
(45) Date of Patent: May 16, 2017

(54) METHOD FOR IDENTIFYING CALCIFICATION PORTIONS IN DUAL ENERGY CT CONTRAST AGENT ENHANCED SCANNING IMAGE

(71) Applicant: General Electric Company, Schenectady, NY (US)

(72) Inventors: Jianying Li, Beijing (CN); Shuo Li, Beijing (CN); Zhihui Sun, Beijing (CN); Ke Sun, Beijing (CN)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 14/552,802

(22) Filed: Nov. 25, 2014

(65) Prior Publication Data

US 2015/0161792 A1      Jun. 11, 2015

(30) Foreign Application Priority Data

Dec. 9, 2013   (CN) .......................... 2013 1 0661111

(51) Int. Cl.
*G06K 9/00* (2006.01)
*G06T 7/00* (2017.01)
*G06T 7/136* (2017.01)

(52) U.S. Cl.
CPC ........ *G06K 9/00536* (2013.01); *G06T 7/0012* (2013.01); *G06K 2209/05* (2013.01); *G06T 7/136* (2017.01); *G06T 2207/10081* (2013.01)

(58) Field of Classification Search
None
See application file for complete search history.

(56) References Cited

U.S. PATENT DOCUMENTS

| 8,294,717 | B2 * | 10/2012 | Zamyatin et al. ............ 345/440 |
| 8,837,677 | B2 * | 9/2014 | Boyden et al. ................ 378/87 |
| 2006/0285737 | A1 * | 12/2006 | Hamill et al. ................ 382/131 |
| 2011/0129057 | A1 | 6/2011 | Paul et al. |

FOREIGN PATENT DOCUMENTS

WO      WO 2004098649 A2 *  11/2004   ............. A61K 49/00

* cited by examiner

*Primary Examiner* — Gandhi Thirugnanam
*Assistant Examiner* — Jiangeng Sun

(57) ABSTRACT

The present invention relates to a method for identifying calcification portions in a dual energy CT contrast agent enhanced scanning image, the method including: filtering the pixels in the dual energy CT contrast agent enhanced scanning image to acquire pixels to be grouped; grouping the pixels to be grouped in a plurality of pixel groups according to the positions of the pixels to be grouped in the dual energy CT contrast agent enhanced scanning image; material-decomposing the pixels in each pixel group; and determining the pixels corresponding to the calcification portions in the plurality of pixel groups according to the result of the material-decomposing. Therefore, the calcification portions can be identified accurately.

17 Claims, 3 Drawing Sheets

METHOD FOR IDENTIFYING CALCIFICATION PORTIONS IN DUAL ENERGY CT CONTRAST AGENT ENHANCED SCANNING IMAGE

TECHNICAL FIELD

The present invention generally relates to computed tomography (CT), and particularly to a method for identifying calcification portions in a dual energy CT contrast agent enhanced scanning image.

BACKGROUND ART

A scanning image of a target object acquired with computed tomography (CT) technologies includes a plurality of pixels of different gray levels. Gray levels of the pixels are proportional to the density of the target to be scanned. The regions of different densities of the object to be scanned are of different X ray absorption levels. Thus, in a CT scanning image, the pixels of lower gray levels are indicative of low density regions of lower X ray absorption levels, and the pixels of higher gray levels are indicative of high density regions of higher X ray absorption levels. Generally, the pixels in a CT scanning image are represented with CT values (in Hu). For instance, the CT values of the pixels corresponding to objects or tissues of higher X ray absorption levels are set higher than the CT values of the pixels corresponding to objects or tissues of lower X ray absorption levels; for instance, the CT value of the pixels corresponding to a bone tissue is set as +1000 Hu, the CT value of the pixels corresponding to water is set as 0 Hu, and the CT value of the pixels corresponding to air is set as −1000 Hu, etc.

At present, the prior art has proposed a dual energy CT technology by which a target to be scanned is scanned with X rays of two kinds of energies and a dual energy CT scanning image of the target to be scanned is acquired. The information included in the dual energy CT scanning image is more sophisticated than the information included in the scanning image acquired by a single energy CT technology which conventionally uses X rays of only one kind of energy to scan the scanning target.

However, in the single energy CT scanning image and the dual energy CT scanning image, different objects in the target to be scanned may be of the same or similar X ray absorption levels. For instance, a bone tissue may be of the same or similar X ray absorption levels with a calcification portion of a blood vessel or other tissues caused by diseases, and thus they may have the same or similar CT values. Therefore, the objects indicated by pixels of the same or similar gray levels in a CT scanning image can hardly be distinguished from each other.

In addition, in order to highlight different objects in a target to be scanned, a contrast agent is applied (e.g. injected) to the target to be scanned before a CT scanning. The CT scanning of an object to be scanned applied with a contrast agent is also called as CT contrast agent enhanced scanning, and the acquired CT scanned image is called as a CT contrast agent enhanced scanning image.

However, the CT value of the pixels corresponding to the contrast agent in a CT contrast agent enhanced scanning image is relatively high, so it is difficult to distinguish the pixels corresponding to the contrast agent from the pixels of calcification portions etc. which have a high density and a higher X ray absorption level in the CT contrast agent enhanced scanning image. In the prior art, there is a method for comparing a CT scanning image (plain scanning image) acquired by a CT scan (plain scan) before application of a contrast agent with a CT contrast agent enhanced scanning image (enhanced scanning image) to identify the pixels corresponding to the calcification portions. However, such a method requires two CT scans of the target, which increases the X ray absorbed dose of the target to be scanned. However, the CT value of the pixels corresponding to the contrast agent in a CT contrast agent enhanced scanning image is relatively high, so it is difficult to distinguish the pixels corresponding to the calcification portions from the pixels corresponding to the contrast agent and a bone tissue etc. which has a high density and a higher X ray absorption level in the CT contrast agent enhanced scanning image. In the prior art, there is a method for comparing a CT scanning image (plain scanning image) acquired by a CT scan (plain scan) before application of a contrast agent with a CT contrast agent enhanced scanning image (enhanced scanning image) to identify the pixels corresponding to the calcification portions. However, such a method requires two CT scans of the target, which increases the X ray absorbed dose of the target to be scanned.

Therefore, a method for identifying calcification portions in a CT contrast agent enhanced scanning image is desirable.

SUMMARY OF THE INVENTION

The purpose of the exemplary embodiments of the present invention is to overcome the problem above and/or other problems in the prior art. An exemplary embodiment of the present invention provides a method for accurately identifying calcification portions in a dual energy CT contrast agent enhanced scanning image, the method including the steps of: filtering the pixels in the dual energy CT contrast agent enhanced scanning image to acquire pixels to be grouped; grouping the pixels to be grouped in a plurality of pixel groups according to the positions of the pixels to be grouped in the dual energy CT contrast agent enhanced scanning image; material-decomposing the pixels in each pixel group; and determining the pixels corresponding to the calcification portions in the plurality of pixel groups according to the result of the material-decomposing.

BRIEF DESCRIPTION OF THE DRAWINGS

A more thorough understanding of the present invention may be obtained by reference to the following detailed description of the exemplary embodiments of the present invention when taken in conjunction with the accompanying drawings, in which.

DETAILED DESCRIPTION OF THE INVENTION

Concrete performing modes of the present invention shall be described below. It shall be pointed out, in process of detailed description of the performing modes, in order to describe concisely, it is not possible for the present specification to describe all the features of the practical performing modes in detail. It shall be appreciated, in the practical performing process of any one performing mode, just like in the process of any one engineering project or designing project, in order to achieve specific targets of the developer and follow the system-related or business-related restrictions, various concrete decisions are frequently made, and this would change from one performing mode to the other performing mode. Furthermore, it shall also be appreciated, though the effort made in the developing process may be complicated and lengthy, for persons skilled in the art relevant to the content disclosed in the present invention, it shall not be deemed that the content of the disclosure is insufficient to make some designs based on the technical contents disclosed in the present specification, for changes to manufacture and production etc. are just conventional technical means.

Unless otherwise defined, the technical terms or scientific terms employed in the claims and description shall be of customary meanings understood by persons skilled in the art of the present invention. The expressions of "first", "second" and similar expressions employed in the description and claims of the present invention patent application are not indicative of ordering, numbering or importance, but they are employed only for distinguishing different components. The expressions of "a", "an" and other similar expressions are not indicative of quantity limits, but they are employed only for representing the existence of at least one. The expressions of "comprise", "include" and other similar expressions mean that the elements or objects drafted before the "comprise" or "include" cover the elements or objects and equivalent elements listed after the "comprise" or "include", and they do not exclude other elements or objects. The expressions of "connect", "link" and other similar expressions are not limited either to physical or mechanical connections, or to direct or indirect connections.

Figure 1:
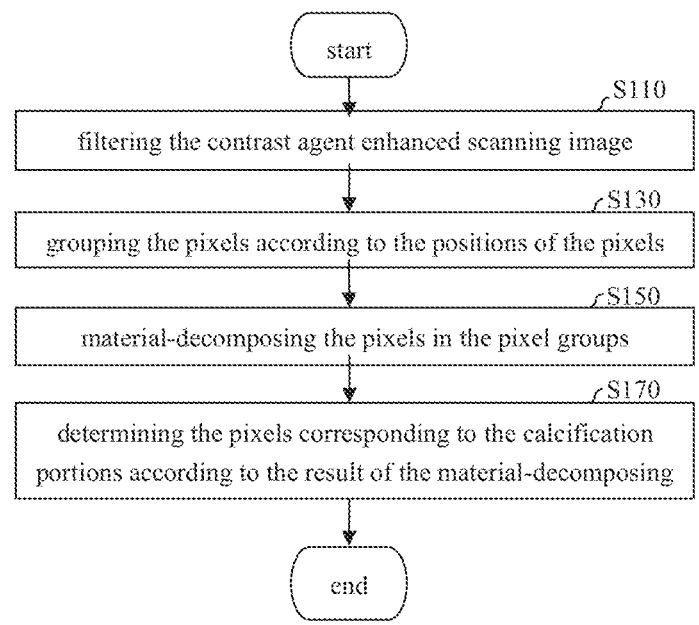
FIG. 1 illustrates a flow chart of a method for identifying calcification portions in a dual energy CT contrast agent enhanced scanning image according to an exemplary embodiment.

FIG. 1 illustrates a flow chart of a method for identifying calcification portions in a dual energy CT contrast agent enhanced scanning image according to an exemplary embodiment.

Figure 2:
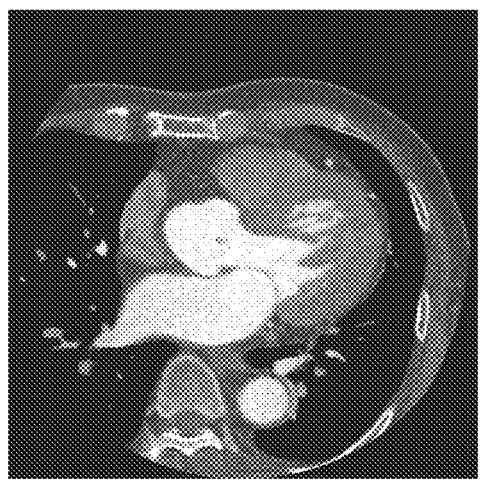
FIG. 2 illustrates an example of a dual energy CT contrast agent enhanced scanning image according to an exemplary embodiment.

As shown in FIG. 1, in operation S110, a dual energy CT contrast agent enhanced scanning image of a target (e.g. a user to be diagnosed) can be filtered. FIG. 2 illustrates an example of a dual energy CT contrast agent enhanced scanning image according to an exemplary embodiment. When the image is filtered, it can be determined whether the CT value of the respective pixels in the dual energy CT contrast agent enhanced scanning image as shown in FIG. 2 is greater than a reference CT value, and the pixels whose CT value is greater than the reference CT value can be determined as filtered pixels. As the filtered pixels shall be grouped after the filtering (which shall be described in detail below), the filtered pixels can also be referred to as pixels to be grouped. Herein, the reference CT value can be a preselected value. In the current exemplary embodiment, in order to distinguish the pixels corresponding to a contrast agent, a bone tissue and a calcification portion of a blood vessel or other tissues caused by diseases from rest pixels in the image, the reference CT value may be selected as 100 Hu. However, the exemplary embodiment is not limited hereto. The dual energy CT contrast agent enhanced scanning image can be filtered with different reference values. For instance, the pixels whose CT value is smaller than the reference CT value can be determined as pixels to be grouped, or the pixels whose CT value is greater than the first reference CT value and smaller than the second reference CT value can be determined as pixels to be grouped (wherein the first reference CT value is smaller than the second reference CT value).

Figure 3:
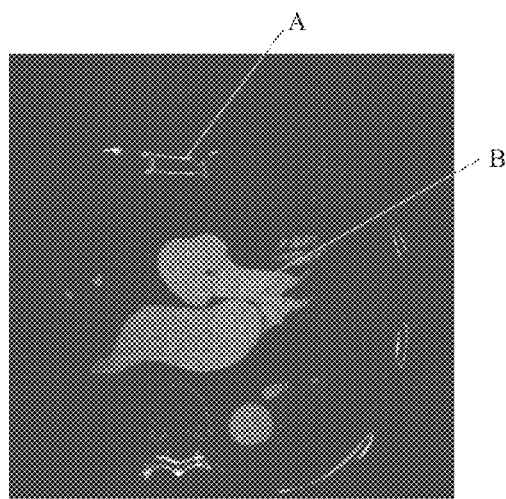
FIG. 3 illustrates an example of a filtered scanning image according to an exemplary embodiment.

FIG. 3 illustrates an example of a filtered scanning image according to an exemplary embodiment.

After the dual energy CT contrast agent enhanced scanning image as shown in FIG. 2 is filtered with a reference CT value of 100 Hu, a filtered scanning image that only includes the pixels to be grouped can be acquired, as shown in FIG. 3. The part A in FIG. 3 can be pixels corresponding to a bone tissue, and the part B can be pixels corresponding to the contrast agent (e.g. the contrast agent included in the blood) and calcification portions.

Returning to FIG. 1, after the dual energy CT contrast agent enhanced scanning image is filtered, the pixels to be grouped acquired by filtering can be grouped (S130). The pixels to be grouped can be grouped in a plurality of pixel groups automatically or manually according to the positions of the pixels to be grouped in the dual energy CT contrast agent enhanced scanning image. For instance, when the pixels to be grouped are grouped automatically, a pixel to be grouped can be first selected (e.g. selected randomly), and then the pixels to be grouped adjacent to the selected pixel to be grouped can be grouped in the same group with the selected pixel to be grouped. After that, the process above can be repeated until all the pixels to be grouped are grouped in corresponding pixel groups. Thus, the pixels whose positions are adjacent to each other of the pixels to be grouped can be automatically grouped in the same pixel group.

Referring to FIG. 1, after the pixels to be grouped are grouped, pixels in each pixel group can be material-decomposed (S150). As a dual energy CT scanning image can provide information that is more sophisticated than the information provided by a single energy CT scanning image, the method can include performing such a material-decomposition that at least two decomposition values are obtained for each pixel. Herein, the two decomposition values of each pixel can be either respectively equivalent density values of two basic materials different from each other, or respectively CT values corresponding to two kinds of energies different from each other used for performing the dual energy CT scanning The exemplary embodiment in which two decomposition values of each pixel are respectively an equivalent density value of water and an equivalent density value of iodide included in the contrast agent will be described.

As shown in FIG. 1, the method can include determining the pixels corresponding to the calcification portions in the plurality of pixel groups according to the result of the material-decomposing after a material-decomposition is performed on the CT value of pixels in each pixel group (S170).

Figure 4:
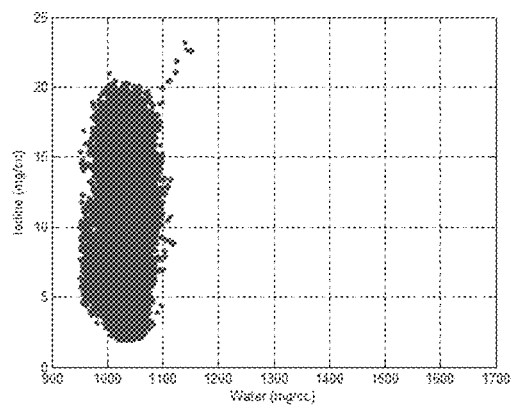
FIG. 4 illustrates an example of a decomposition scatter diagram corresponding to pixel groups according to an exemplary embodiment.

Specifically, a decomposition value scatter diagram indicative of the relationship between two decomposition values of each pixel in the pixel group can be established according to decomposition values of pixels in each pixel group. FIG. 4 illustrates a decomposition scatter diagram showing a pixel group (group B) corresponding to the part B in FIG. 2 according to an exemplary embodiment. The object corresponding to each pixel group can be manually or automatically determined according to the positions of the pixels of the pixel group in the decomposition value scatter diagram. For instance, in the decomposition value scatter diagram of the part B in FIG. 4, most of the pixels are distributed in the region limited by the horizontal axis (water) from about 950 mg/cc to about 1100 mg/cc and the vertical axis (iodine) from about 2 mg/cc to about 20 mg/cc, while some of the pixels can be distributed outside the region. As shown in FIG. 4, such pixels can form a shape of a tail extending from most of the pixels. Therefore, it can be automatically or manually determined that the tail pixels are pixels corresponding to the calcification portions.

For instance, when automatically determining the pixels corresponding to the calcification portions, the method can include first determining characteristic regions corresponding to the calcification portions in the decomposition value scatter diagram of the pixel group, and then determining the pixels in the characteristic regions as pixels corresponding to the calcification portions. Such characteristic regions can be either preset or determined according to distribution of the pixels in the decomposition value scatter diagram. For instance, as shown in FIG. 4, the method can include determining the regions greater than 1100 mg/cc (water) and greater than 20 mg/cc (iodine) as characteristic regions corresponding to the calcification portions.

According to another exemplary embodiment, after determining the pixels corresponding to the calcification portions automatically or manually as mentioned above, the method can include performing a dilation algorithm. For instance, the method can include selecting a pixel which has been determined to correspond to a calcification portion, and then applying the dilation algorithm to the selected pixel to determine whether the pixels near the selected pixel correspond to the calcification portions.

Specifically, if the pixels of the scanning image are arranged in a matrix of M×N, the newly dilated pixels after applying a first dilation algorithm to the selected pixel can be 8 pixels around the selected pixel (i.e. 8 peripheral pixels in the 3×3 pixel matrix centered at the selected pixel), and the newly dilated pixels after applying a second dilation algorithm to the selected pixel can be 16 peripheral pixels in the 5×5 pixel matrix centered at the selected pixel. The method can include calculating average value of CT values of the respectively newly dilated pixels.

Figure 5:
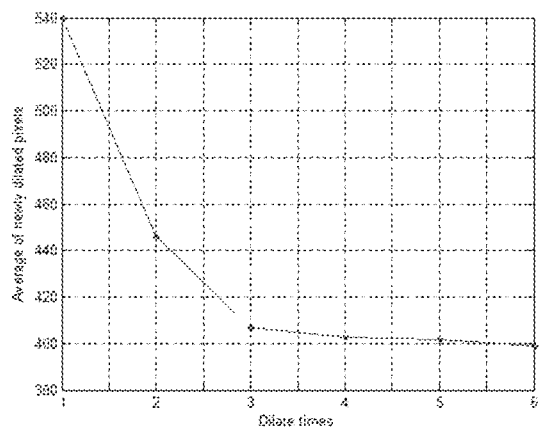
FIG. 5 illustrates a curve diagram of applying dilation algorithms to the pixels determined to correspond to the calcification portions according to an exemplary embodiment.

When the average CT value is greater than a predetermined value, the pixels can be determined to correspond to the calcification portions. Then the next dilation algorithm can be performed until the average CT value of the newly dilated pixels is not greater than the predetermined value. FIG. 5 is a curve diagram of the average CT values of the pixels obtained by applying dilation algorithms to the pixels determined to correspond to the calcification portions according to an exemplary embodiment. As shown in FIG. 5, the average CT value of the pixel obtained by the fourth dilation algorithm can be not greater than the predetermined value, e.g. 405 Hu. Therefore, the pixels obtained by the first to third dilation algorithms can be determined to correspond to the calcification portions while the pixels obtained by the fourth to sixth dilation algorithms are determined not to correspond to the calcification portions.

However, the exemplary embodiments are not limited hereto. In other exemplary embodiments, the method can include calculating the difference between the average CT value of the pixels obtained by the (N−1)th dilation algorithm and the average CT value of the pixels obtained by the Nth dilation algorithm, and when the difference is smaller than the predetermined value, the pixels obtained by the first to the (N−1)th dilation algorithms can be determined to correspond to the calcification portions. The N hereof is an integer greater than 1. For instance, in the exemplary embodiment as shown in FIG. 5, the difference between the average CT value of the pixels obtained by the second dilation algorithm and the average CT value of the pixels obtained by the third dilation algorithm can be greater than a predetermined value (e.g. 30 Hu), while the difference between the average CT value of the pixels obtained by the third dilation algorithm and the average CT value of the pixels obtained by the fourth dilation algorithm can be smaller than the predetermined value (e.g. 30 Hu). Therefore, the pixels obtained by the first to third dilation algorithms can be determined to correspond to the calcification portions while the pixels obtained by the fourth to sixth dilation algorithms are determined not to correspond to the calcification portions.

Therefore, according to an exemplary embodiment, the calcification portions can be accurately identified in a dual energy CT contrast agent enhanced scanning image.

Figure 6:
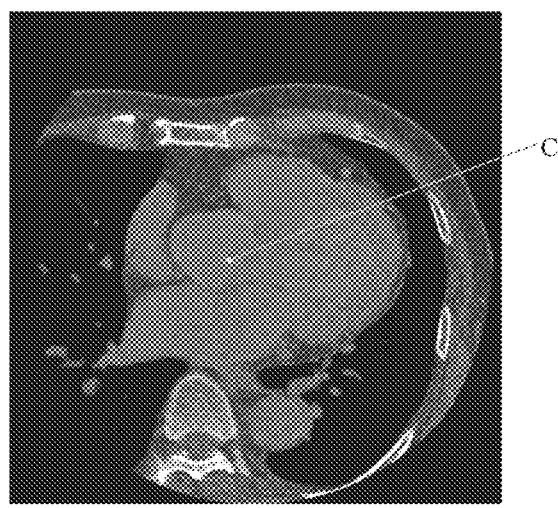
FIG. 6 illustrates an example of a processed scanning image including pixels whose CT value is reduced according to an exemplary embodiment.

Furthermore, in an alternative exemplary embodiment, after determining the pixels corresponding to the calcification portions, the method can include changing the CT value of the pixels in a dual energy CT contrast agent enhanced scanning image according to the determining result. For instance, the CT value of the pixels near the pixels corresponding to the calcification portions can be reduced. FIG. 6 is an example of a processed scanning image including pixels whose CT value is reduced according to an exemplary embodiment. As shown in FIG. 6, a calcification portion (i.e. the portion indicated by C in FIG. 6) can be highlighted for the gray difference thereof from the pixels nearby (e.g. pixels corresponding to the contrast agent).

According to an exemplary embodiment, the method can include identifying a calcification portion in a dual energy CT contrast agent enhanced scanning image, and thus highlight the identified calcification portion. Furthermore, as the calcification portion can be identified only by performing a dual energy CT contrast agent enhanced scan only once, it does not need to perform a non-contrast agent enhanced scan before performing a contrast agent enhanced scan on the target, which reduces the scan performing duration and amount of X ray radiated to the target (e.g. a user to be treated).

Some exemplary embodiments have been described above. However, it shall be appreciated that various modifications may be made hereto. For instance, if the described technology is implemented in different orders and/or if the described system, architecture, device or circuit components are combined in a different form and/or replaced or supplemented with additional components or equivalence, it can achieve suitable results. Correspondingly, other performing modes also fall within the protection scope as defined in the appended claims.

What is claimed is:

1. A method for identifying calcification portions in a dual energy computerized tomography (CT) contrast agent enhanced scanning image, the method comprising the steps of:
    filtering pixels in the dual energy CT contrast agent enhanced scanning image to acquire pixels to be grouped;
    grouping the pixels to be grouped into a plurality of pixel groups according to positions of the pixels to be grouped;

material-decomposing the pixels in each of said pixel groups; and identifying pixels in one of the material-decomposed groups corresponding to a calcification portions in the scan image, wherein the step of identifying the pixels in one of the material-decomposed groups corresponding to the calcification portions comprises:

establishing a decomposition value scatter diagram indicative of the relationship among the material-decomposing results of each pixel in the pixel group according to the result of the material-decomposing for pixels in each pixel group; and determining whether the pixels correspond to the calcification portions according to the positions of pixels of the pixel group in the decomposition value scatter diagram, wherein the pixel group comprises pixels with CT values outside a designated region.

2. The method according to claim 1, wherein the step of filtering comprises:

determining whether a CT value of a pixel is greater than a reference CT value; and identifying the pixel whose CT values is greater than the reference CT value as a pixel to be grouped.

3. The method according to claim 1, wherein the step of filtering comprises:

determining whether a CT value of a pixel is smaller than a reference CT value; and identifying the pixel whose CT values is smaller than the reference CT value as a pixel to be grouped.

4. The method according to claim 1, wherein the step of filtering comprises:

determining whether a CT value of a pixel is greater than a first reference CT value and smaller than a second reference CT value; and identifying the pixel whose CT values is greater than the first reference CT value and smaller than the second reference CT value as a pixel to be grouped.

5. The method according to claim 1, wherein the step of grouping the pixels to be grouped comprises grouping the pixels according to their position.

6. The method according to claim 5, wherein the step of grouping the pixels to be grouped comprises grouping the pixels whose positions are adjacent to each other in a same pixel group.

7. The method according to claim 1, wherein the step of material-decomposing the pixels comprises obtaining at least two decomposition values for each pixel.

8. The method according to claim 1, wherein the step of identifying whether the pixels correspond to the calcification portions comprises determining the pixels of the pixel groups that are located in the characteristic regions corresponding to the calcification portions in the decomposition value scatter diagram to correspond to the calcification portions.

9. The method according to claim 8, wherein the step of identifying whether the pixels correspond to the calcification portions comprises:

selecting pixels from the pixels determined to correspond to the calcification portions; and applying a dilation algorithm to the selected pixels to determine whether pixels near the selected pixels correspond to the calcification portions.

10. The method according to claim 9, further comprising calculating an average CT value of the dilated pixels.

11. The method according to claim 10, wherein the step of determining whether pixels near the selected pixels correspond to the calcification portions comprises:

when the average CT value of the pixels acquired by the dilation algorithm is greater than a predetermined value, determining the pixels as pixels corresponding to the calcification portions.

12. The method according to claim 10, wherein the step of identifying whether pixels near the selected pixels correspond to the calcification portions comprises:

when the difference between the average CT value of the pixels acquired by the (N−1)th dilation algorithm and the average CT value of the pixels acquired by the Nth dilation algorithm is smaller than a predetermined value, determining the pixels acquired by the first to (N−1)th dilation algorithms as pixels corresponding to the calcification portions, where the N is an integer greater than 1.

13. The method according to claim 6, wherein two characteristic values of the pixels are respectively equivalent density values of two basic materials different from each other.

14. The method according to claim 6, wherein two characteristic values of the pixels are respectively CT values corresponding to two kinds of energies different from each other used for performing the dual energy CT scanning in order to acquire a dual energy CT contrast agent enhanced scanning image.

15. The method according to claim 2, wherein the reference CT value is 100Hu.

16. The method according to claim 1, wherein the method further comprises the step of changing the CT values of the pixels in the dual energy CT contrast agent enhanced scanning image based on the determining results of the pixels corresponding to the calcification portions.

17. The method according to claim 15, wherein the step of changing the CT values of the pixels comprises: reducing the CT values of the pixels near the pixels corresponding to the calcification portions.

* * * * *